US012572812B2

(12) United States Patent
Tennant

(10) Patent No.: US 12,572,812 B2
(45) Date of Patent: Mar. 10, 2026

(54) GRAPH NEURAL NETWORKS FOR PARTICLE ACCELERATOR FACILITIES

(71) Applicant: JEFFERSON SCIENCE ASSOCIATES, LLC, Newport News, VA (US)

(72) Inventor: Christopher Tennant, Williamsburg, VA (US)

(73) Assignee: JEFFERSON SCIENCE ASSOCIATES, LLC, Newport News, VA (US)

(*) Notice: Subject to any disclaimer, the term of this patent is extended or adjusted under 35 U.S.C. 154(b) by 750 days.

(21) Appl. No.: 17/958,555

(22) Filed: Oct. 3, 2022

(65) Prior Publication Data

US 2023/0115297 A1 Apr. 13, 2023

Related U.S. Application Data

(60) Provisional application No. 63/254,190, filed on Oct. 11, 2021.

(51) Int. Cl.
*G06F 16/00* (2019.01)
*G06N 3/04* (2023.01)
*G06N 3/0895* (2023.01)

(52) U.S. Cl.
CPC ............. *G06N 3/0895* (2023.01); *G06N 3/04* (2013.01)

(58) Field of Classification Search
CPC ........... G06N 3/0895; G06N 3/04; G06N 3/09
See application file for complete search history.

(56) References Cited

U.S. PATENT DOCUMENTS

| | | | | |
|---|---|---|---|---|
| 11,144,291 B1 | 10/2021 | Zheng | | |
| 11,151,446 B2 | 10/2021 | Barham | | |
| 11,361,449 B2 | 6/2022 | Ramezani | | |
| 11,373,088 B2 | 6/2022 | Bleiweiss | | |
| 2010/0072392 A1* | 3/2010 | Koehn | ................ | H01J 37/3045 |
| | | | | 250/397 |
| 2019/0311877 A1* | 10/2019 | Willis | ..................... | H01J 37/28 |
| 2019/0311881 A1* | 10/2019 | Lavely | .................... | H01J 37/28 |
| 2022/0318596 A1* | 10/2022 | Sarshogh | ............... | G16C 20/70 |
| 2022/0409929 A1* | 12/2022 | Rusanen | .............. | A61N 5/1031 |
| 2023/0153568 A1* | 5/2023 | Guan | ....................... | G06N 3/04 |
| | | | | 706/25 |

(Continued)

*Primary Examiner* — Noosha Arjomandi

(57) ABSTRACT

A method or tool for an efficient, data-driven approach to beam tuning in particle accelerators that leverages deep learning over structured data. A beamline is represented as a graph, where individual elements are nodes and relationships between elements are edges. Element parameters are captured as node features. A graph neural network is used to generate a whole-graph embedding that preserves structural information, and dimensionality reduction techniques are applied to visualize low-dimensional representations. Providing a category label for each embedding to identify optimal regions of parameter space. The method serves as a global diagnostic, inasmuch as it monitors a high-dimensional space and provides feedback to operators when changes are made. Operators can track if changes during beam tuning move the configuration away or towards optimal regions of parameter space. On-line and off-line tool embodiments of the beam tuning tool are described.

9 Claims, 6 Drawing Sheets

(56)         References Cited

U.S. PATENT DOCUMENTS

| | | | |
|---|---|---|---|
| 2023/0310892 A1* | 10/2023 | Basiri ................... | G06N 3/092 |
| | | | 378/65 |
| 2024/0078415 A1* | 3/2024 | Langford ............... | G06N 3/048 |
| 2025/0061304 A1* | 2/2025 | Waghmare ............. | G06N 3/042 |
| 2025/0148280 A1* | 5/2025 | Cocos ..................... | G06N 3/08 |

* cited by examiner

GRAPH NEURAL NETWORKS FOR PARTICLE ACCELERATOR FACILITIES

This application claims the priority of Provisional U.S. Patent Application Ser. No. 63/254,190 filed Oct. 11, 2021.

The United States Government may have certain rights to this invention under Management and Operating Contract No. DE-AC05-06OR23177 from the Department of Energy.

BACKGROUND OF THE INVENTION

Enormous efforts are expended creating high-fidelity simulations of particle accelerator beamlines.

While these simulations provide guidance on how to set up, or tune, a beamline there always exists a gap between the simulated ideal and the real-world implementation. Bridging that gap often requires a laborious and time consuming process known as beam tuning.

This invention describes an efficient, data-driven approach to beam tuning in particle accelerators that leverages deep learning over structured data (graphs).

The method allows for real-time monitoring of a high-dimensional space and visual feedback to operators to more quickly converge to known optimal beamline configurations, which thereby reduces machine downtime. The term "high-dimensional" as used herein means that that number of features of the system under study is too large to be represented in standard two or three dimensional visualizations and/or the number of features exceeds what is reasonable for a human to continuously monitor over the course of many hours.

BRIEF DESCRIPTION OF THE SEVERAL VIEWS OF THE DRAWING(S)

Reference is made herein to the accompanying drawings, which are not necessarily drawn to scale, and wherein:

FIG. 1 is a line graph depicting a way to represent text for natural language processing (NLP) applications (left), a 2D grid (middle) as a way to represent images for computer vision tasks, and an arbitrary graph (right) for representing more complex relationships between data.

FIG. 2 is an illustration depicting an arbitrary particle accelerator beamline (top) and one possible way to construct a corresponding graph representation (bottom). The beamline consists of elements that can be considered settings, including magnetic components such as quadrupoles (Q), correctors (COR), and solenoids (SOL) and readings, including diagnostics such as beam position monitors (BPM) and beam current monitors (BCM). The nodes represent individual elements, node features correspond to element parameters, and a user-specified window of two elements defines edges between nodes.

FIG. 3 is an example of a 2D visualization where each marker represents a low-dimensional embedding of a graph representation of an accelerator beamline, and where each cluster is associated with a label ("good", "bad") that corresponds to the goodness of a setup in the particle accelerator.

FIG. 4 is an example of a 2D visualization whereby real-time, beam tuning by an operator in a particle accelerator control room is visualized as a trajectory in a low-dimensional embedding space. In this example the beamline starts in a region of bad parameter space (denoted by marker "1") and by visual feedback the operator is able to move to a region of good parameter space (denoted by marker "7").

DETAILED DESCRIPTION OF THE INVENTION

The present invention is a method for representing a particle accelerator beamline as a graph. Although the method is described herein with reference to particle accelerator facilities, it can be applied to many real world operational systems that require human-in-the-loop tuning.

Figure 1:
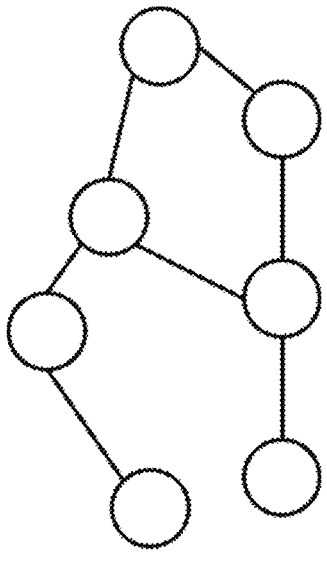
Figure 1:
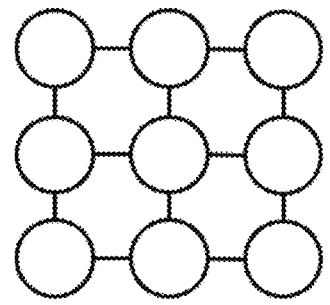
Figure 1:
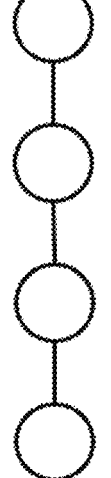

With access to information-rich data sources, an increase in compute power, and the availability of user-friendly, open source software, the field of artificial intelligence—and deep learning (DL) in particular—is making revolutionary impacts in a variety of fields and sectors. Arguably, the biggest advances in DL are applications for natural language processing (NLP) and computer vision. The data for each of these domains (i.e., text and images) can each be considered a type of graph. For example, with reference to FIG. 1, text can be represented by a line graph where a word is related to its predecessor and successor, while images are a regular 2D grid of pixel values.

A graph is a powerful mathematical framework that describes the relationship between entities. Practically, a graph is comprised of nodes and edges. A set of properties (referred to as features) can be associated with any node or edge. Edges are said to be directed if, for example, an edge exists from node A to node B but not from node B to node A. Homogenous graphs are comprised of nodes all of the same type, whereas heterogeneous graphs are comprised of different types of nodes and/or edges.

The novelty outlined in the present invention is to use graphs to represent accelerator beamlines and leverage graph neural networks (GNNs) for a variety of accelerator-specific downstream tasks. The primary applications are aimed at efficient beam tuning, which represents a significant source of machine down time.

Current methods of beam tuning utilize high-fidelity simulations of accelerator beamlines. While these simulations provide guidance on how to set up a beamline, there always exists a gap between the simulated ideal and the real-world implementation. Bridging that gap often requires a laborious and time consuming process known as beam tuning. This invention develops a data-driven approach to beam tuning that leverages deep learning over graphs.

Figure 2:
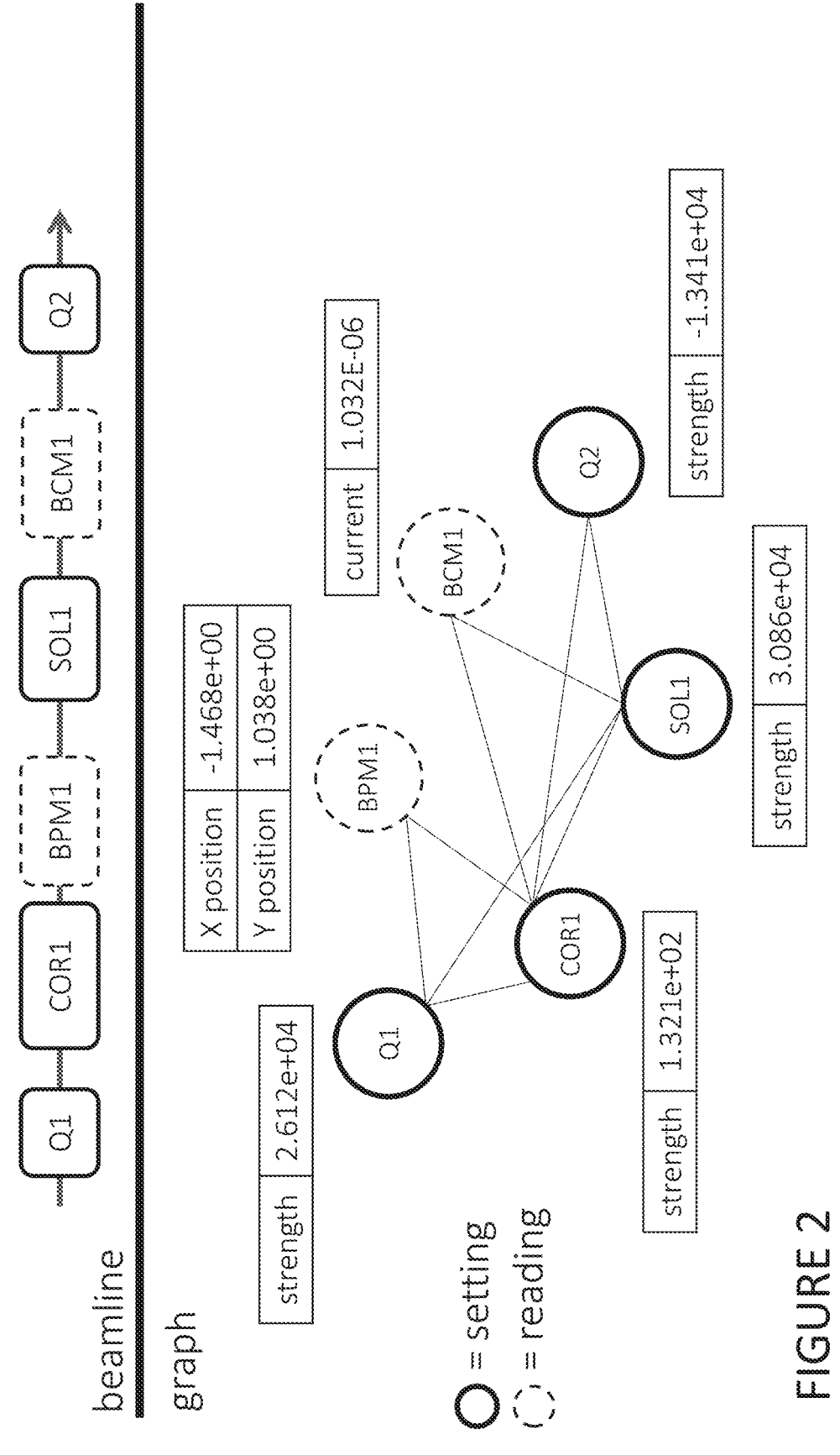

There are many possible ways to construct a graph and choosing the best representation will depend on the downstream task and the specifics of the beamline. A simple example for the sake of illustration is given in FIG. 2. The beamline consists of five element types (quadrupole, corrector, beam position monitor (BPM), solenoid, and beam current monitor (BCM)) which are mapped to nodes. Each node type has a unique set of features; quadrupoles, correctors, and solenoids have a single value corresponding to their field strength, BPMs have two features which correspond to the horizontal and vertical position readings, and BCMs have a feature corresponding to the current readback. It should be noted that in addition to scalar quantities, features can include other information-rich data sources, including but not limited to, text and/or images. As an example, a graph might contain a node that represents a beamline viewer with one of its features being the image recorded by the diagnostic. The resulting graph for this example is heterogeneous and undirected. A user-defined "window" defines the edges. In this example a window of 2 is used which means each setting element/node is connected to the two setting elements/nodes immediately downstream and any reading nodes in between. A setting node is one in which the operator can modify the setpoint and is used for routine beam tuning tasks. In this example these would include the magnetic elements (quadrupole, solenoid, corrector). Reading nodes, on the other hand, are passive readbacks and represent diagnostics in the beamline (BPM, BCM). Depending on the downstream task and the beamline, other graph representations will benefit from a different window size. Though not explicitly shown in this example, using a graph framework allows global beamline parameters to be incorporated as well. For example, a "master node" that has connections to each node in the graph could contain readings from temperature sensors in the beamline enclosure, outdoor temperature and humidity, date and time, beamline vacuum readings, and/or electronic log entries, among other things. Additional information can be embedded into the graph with the use of edge weights. Edges can be assigned individual weights, such as the inverse of the distance between the elements represented by the two nodes it connects. The inverse is used so that elements within close proximity to one another have a greater weight.

A graph neural network is a framework for defining deep neural networks on arbitrary graph data. A GNN pipeline involves defining an input graph representation of the data, applying a so-called GNN layer (also referred to as a diffusion layer, propagation layer or message-passing layer) several times and feeding the results into a task layer.

The workflow to generate graph embeddings involves pre-training a GNN model on a large set of unlabeled data using a technique called self-supervised learning (SSL). The term "pre-training" as used herein means that the model is trained on a pretext task as a way to learn better representations that will enhance model performance on downstream tasks. That is, rather than a model initialized with random weights, the motivation is that a model pre-trained on a large body of unlabeled data will learn robust embeddings that can more easily be fine-tuned with a small labeled dataset in the standard supervised way. The term "fine-tuning" as used herein means using a model that has been trained for a particular pretext task and then training it on a different set of data to make it perform a second, similar task. Methods for self-supervised learning try to learn as much as possible from the data alone, so a model can be fine-tuned for a specific downstream classification task. In this way years of operational data stored in an archiver can be leveraged without the laborious and expensive task of hand labeling the data. A graph neural network is implemented to learn rich feature vectors for each graph. A special class of loss function, known as contrastive loss, is implemented which maximizes agreement between latent representations from similar graph pairs ("positive pairs") while minimizing agreement from unlike pairs ("negative pairs"). The model is then fine-tuned on the downstream task using a smaller, labeled dataset. Finally, a dimensionality reduction technique is used to visualize the results in two or three dimensions. To maintain model performance over time, and to guard against data drift, the model will be trained at regular intervals. Data collection is ongoing and passive, and does not require investment in additional diagnostics and equipment.

With the ability to train a GNN in an end-to-end manner, a variety of downstream tasks are possible, including 1) Node-level Prediction: Given a graph representation of an accelerator beamline, the task is to predict node features by training on historical, archived data. For instance, predicting a particular quadrupole strength. In practice, setting the correct quadrupole strength is often done using conventional simulation tools for initial guidance, and then fine-tuning via trial and error. Using GNNs would provide a data-driven solution.

2) Edge-level Prediction: The GNN model predicts particular edge weights. Rather than impose a particular bias, this represents a data-driven approach to understanding the relative importance of elements to one another.

3) Graph-level Prediction: For this task, an entire graph is reduced to a single vector representation. Because accelerators are represented by so many features, the dimensionality reduction can be used for visualizing a machine state.

The ability to generate information-rich, low-dimensional embeddings of the state of a beamline at an arbitrary date and time (graph-level prediction) provides a novel tool for the operation of a particle accelerator for at a variety of tasks.

It enables data exploration of a high-dimensional space representing beamline data over many months or years, allowing for both short- and long-term patterns or trends to be observed.

By using a specific GNN architecture called a Graph Attention Network (GAT), analysis of the resultant attention weights of the trained model reveal insights into complex relationships between beamline elements. A GAT layer aggregates information from a node's neighbors. As the name suggests, self-attention is used so rather than each node contributing uniformly, the model learns the neighbors which are more important and weights them differently during aggregation.

Tuning a machine as complex as a particle accelerator often involves multiple iterations with a high-fidelity simulation. That is, a replica of the beamline is modeled in a particle tracking code and the settings (magnet strengths, accelerating cavity gradients and phases) are determined off-line, either by trial and error or through an optimization method. Despite best efforts, however, simulated beamlines never match reality. Magnet misalignments, power supply jitter, interference from Earth's magnetic field, miscalibrated equipment, among many other factors contribute to deviations from the ideal simulated entity. This provides strong motivation for developing a data-driven approach, to enable faster and more efficient convergence to optimal beamline configurations.

Figure 3:
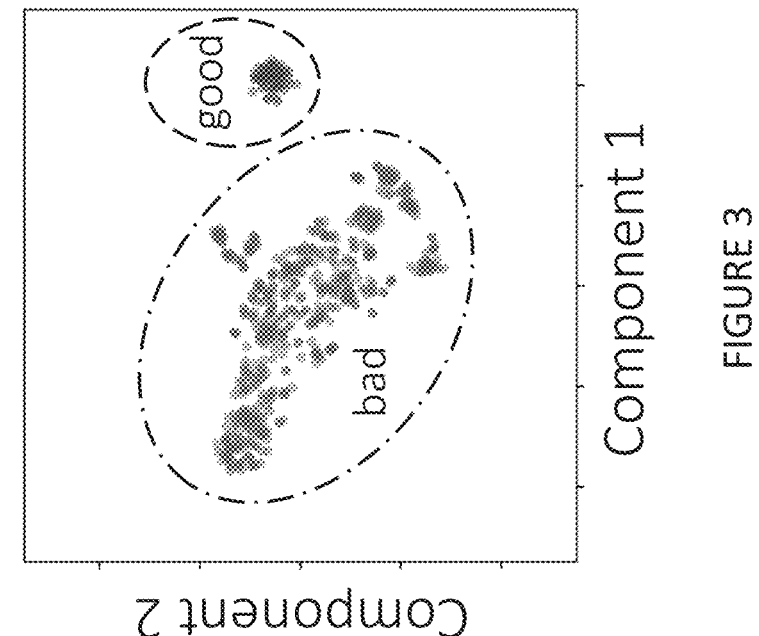

By associating a label (i.e. "good", "bad") with a subset of the embeddings, optimal regions of the latent space can be identified. This is illustrated in FIG. 3.

Figure 4:
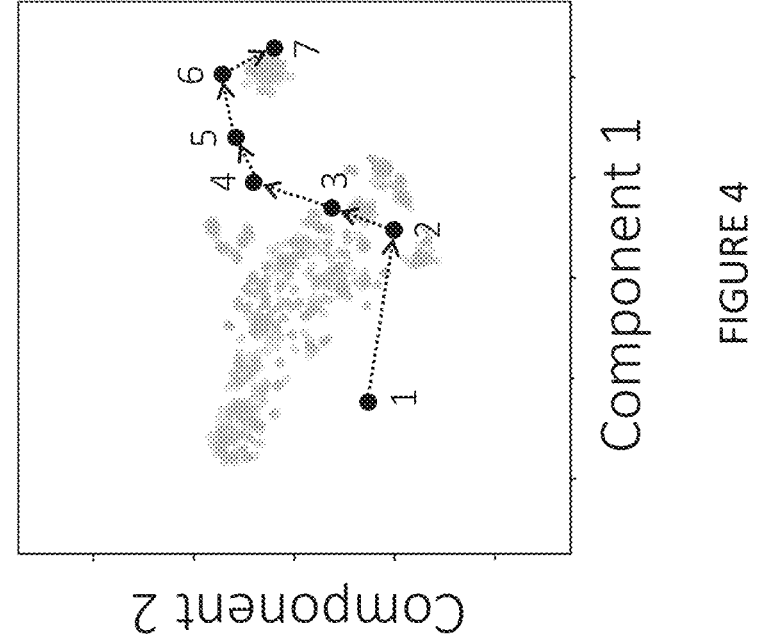

Mapping out the latent space allows for immediate feedback of changes to specific beamline elements and the impact on the configuration as a whole. There are at least two ways in which this can be leveraged for beam tuning tasks:

1) On-line tool: tracking how a beamline configuration moves through latent space during beam tuning, with the benefit of seeing if changes are moving the system further away, or closer towards, a desired destination (i.e., regions marked by as "good"). This is illustrated in FIG. 4.

Figure 5:
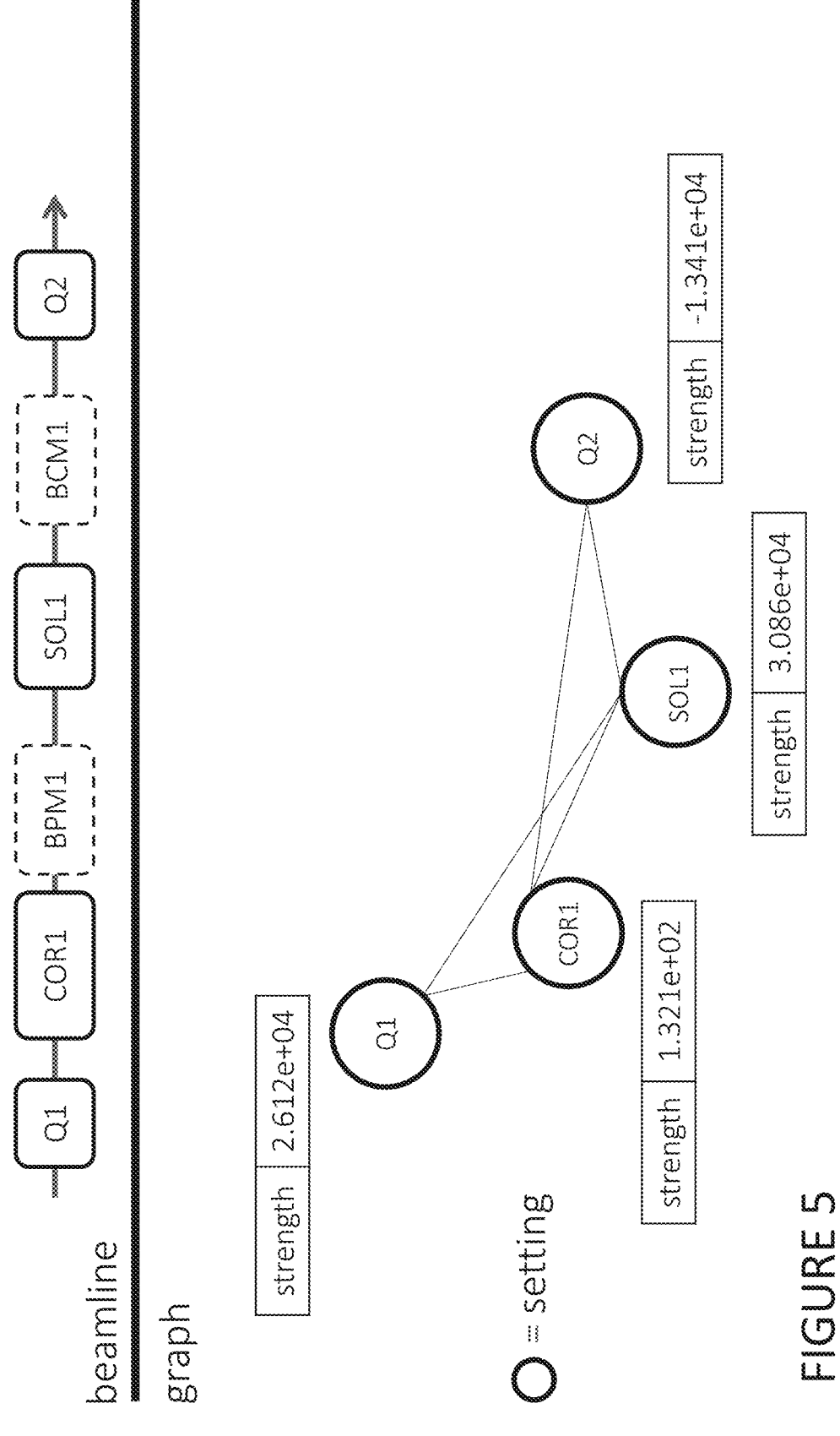
FIG. 5 is depicts a particle accelerator beamline (top) and one possible way to construct a corresponding graph using only setting nodes.

2) Off-line tool: avoiding the need for valuable, dedicated time on the particle accelerator provides strong motivation for the ability to tune a beamline in an off-line manner. However, an off-line tuning tool requires modification of the input graph. Changing a setting node's feature(s) will cause a change in features of all downstream reading nodes. For example, changing a corrector strength would modify the features of all downstream BPM nodes (and others as well). Therefore, before a graph can be embedded, an additional step of applying a node prediction task to predict all downstream changes each time a setting is changed would have to implemented. This represents a non-trivial task. Another option is to use "settings only" graphs (i.e. remove or suppress all reading nodes) as illustrated in FIG. 5. In this way a change in one setting node will not necessitate any changes to downstream nodes. Just as if they were in the control room, a user has the ability to modify setting nodes but in an off-line manner. Every time a change is made, the new configuration is converted to a graph input to a pre-trained model. The resulting embedding is plotted. In this way a user can see the effect of changing settings, and specifically if those changes move the state of the beamline away or towards the good regions of parameter space. Because of the data-driven approach, once a suitable configuration is found off-line, the settings can be transferred to the machine where little to no additional iterating will be necessary.

This invention provides a means to measure the reproducibility of the machine in a quantifiable way by using an appropriate distance metric in the latent space. For instance, if a beamline starts in configuration "A" and then the machine is turned off (i.e., for required maintenance) and then turned back on, the extent of the machine's ability to recover to the same location ("A") in parameter space can be quantified.

Figure 6:
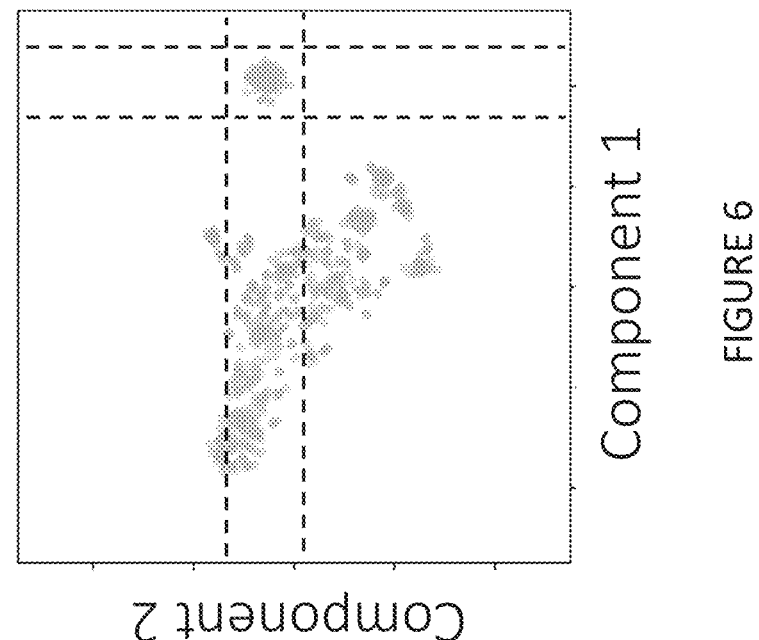
FIG. 6 depicts how with knowledge of the good and bad regions of parameter space (see FIG. 3), an operator is able to define a bounding region in the low-dimensional embedding space (denoted by dashed lines) for monitoring purposes.

In addition to reproducibility, regularly tracking the beamline configuration in latent space over time addresses system stability. Accelerators utilize hard-coded alarms to alert operators when specific control system variables exceed tolerances. It is trivial to track a single control system variable, but this invention provides a means to track a high-dimensional space over time. For example, by plotting the configuration of a beamline in latent space at the beginning of a shift, and updating that low-dimensional representation every minute over the next 8 hours and observing the resulting jitter. As an extension this enables development of tool as depicted in FIG. 6 where a user defines a bounding box of stable/good running. In the background, the beamline configuration is queried at short intervals, a graph generated, embedded in the latent space, and an alert is sent to operators whenever the system crosses the boundary.

A partial list of novel features as a result of applying deep learning over graph representations of accelerator beamlines is listed below:

1) It bridges the gap between idealized simulations and the real-world implementation, providing a principled, date-driven approach to the operation of an accelerator.

2) It leverage years (even decades in some instances) of under-utilized historical operational data of accelerator facilities for a variety of downstream tasks.

3) It leverages under-utilized real-time streaming data at accelerator facilities as a way to construct a digital twin of the machine. By digital twin we mean a digital, dynamic representation of a real-life physical object which is connected real-time to its physical twin and is used to monitor and analyze its condition and operation.

4) It addresses an inherent limitation of current beamline simulations, in that a graph framework can incorporate critical accelerator components which are neglected in conventional beamline models and simulations. For instance, power supplies, klystrons, trim cards, etc. are never incorporated into typical simulations and yet they can be accounted for a in straightforward way using graphs. Furthermore, a large body of historical data exists about their performance characteristics.

5) It is a framework that allows one to represent an accelerator in its entirety. It includes standard beamline components (RF cavities, magnetic elements, diagnostics) but can also include their associated power supplies, vacuum readbacks, information from beam loss and radiation monitors, cryogenics information, environmental conditions, cooling water properties, etc.

6) The framework is flexible. It can be fine-tuned to the level of detail necessary for the downstream task. It may be sufficient to create a graph that represents the quadrupoles in a short section of beamline, or it may require a graph that represents the entire accelerator along with its ancillary systems.

7) Data collection for ongoing training and analysis is passive, that is, it does not require dedicated beam studies time or investment in additional diagnostics and equipment. At most accelerator facilities it is already available in a database of historical operational data.

The method of the current invention has potential application beyond particle accelerators to other high-dimensional systems that require human-in-the-loop tuning more generally.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

I claim:

1. A method of representing the state of a particle accelerator beamline with a low-dimensional, embedding, the method comprising:

representing a beamline as a graph, with nodes representing elements, node features representing element attributes, and edges used to capture relationships between elements;

pre-training a graph neural network in a self-supervised way using unlabeled, historical operational data;

fine-tuning the graph neural network on a small set of labeled data in a supervised way;

implementing scheduled training to maintain performance of the method, whereby the method is re-trained at regular intervals using data collected since the previous scheduled training;

visualizing the graph embeddings generated by the trained model on new data by reducing the dimensionality to two or three dimensions for ease of interpretation;

monitoring the stability of the particle accelerator beamline, wherein monitoring the stability of the particle accelerator comprises updating the beamline graph embedding and visualization in short, regular intervals; and observing the level of jitter in parameter space;

providing a means for operators to define a bounding box for a desired region of parameter space; and providing an alert system for notifying when the system exceeds the boundaries of the bounding box.

2. The method of claim 1 comprises exploring a high-dimensional space representing historical operational data over man' months or years identifying trends and patterns in the data.

3. The method of claim 1 comprising analyzing attention weights of the graph neural network to provide a metric for the importance of the relationships between nodes, said relationships revealing complex relationships between beamline components.

4. The method of claim 1 comprising:

identifying optimal regions of parameter space for graph embeddings; and labeling good and bad subsets of the graph embed-dings.

5. The method of claim 4 comprising:

an off-line tool for rapid beamline optimization; and said nodes including setting nodes and reading nodes.

6. The method of claim 5 wherein said off-line tool comprises suppressing the reading nodes of the graph representation of the beamline.

7. The method of claim 6 comprising:

enabling users of said off-line tool to modify said setting nodes in an off-line manner; and converting the new configuration after each modification to a graph input to a pre-trained model; and plotting the embedding to display the effect of the change of settings, said plot displaying the state of the beam-line with respect to good regions of the parameter space.

8. The method of claim 1 comprising an on-line tool to provide near real-time feedback on the effect of tuning changes.

9. The method of claim 8 wherein said online tool comprises:

tracking in real-time how a beamline setup is moving through the low-dimensional space during beam tun-ing; and determining if operating changes are moving the system closer or farther from optimal regions.

\* \* \* \* \*